US010527871B2

(12) United States Patent
Saeedi et al.

(10) Patent No.: US 10,527,871 B2
(45) Date of Patent: Jan. 7, 2020

(54) DIFFERENTIAL RING MODULATOR (71) Applicant: California Institute of Technology, Pasadena, CA (US)

(72) Inventors: Saman Saeedi, Pasadena, CA (US); Behrooz Abiri, Pasadena, CA (US); Azita Emami, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/070,665

(22) Filed: Mar. 15, 2016

(65) Prior Publication Data
US 2016/0306201 A1 Oct. 20, 2016

Related U.S. Application Data (60) Provisional application No. 62/133,849, filed on Mar. 16, 2015.

(51) Int. Cl.
G02F 1/025 (2006.01)
G02B 6/38 (2006.01)
G02B 6/293 (2006.01)
H04B 10/54 (2013.01)

(52) U.S. Cl.
CPC ............. *G02F 1/025* (2013.01); *G02B 6/293* (2013.01); *G02B 6/38* (2013.01); *H04B 10/541* (2013.01); *G02F 2203/50* (2013.01)

(58) Field of Classification Search
CPC ..... G02F 1/025; G02F 2203/50; G02B 6/293; G02B 6/38; H04B 10/541
See application file for complete search history.

(56) References Cited

U.S. PATENT DOCUMENTS 5,867,990 A * 2/1999 Ghoshal .................. F25B 21/02
165/185
5,929,430 A * 7/1999 Yao .......................... H01S 5/065
250/205

(Continued)

FOREIGN PATENT DOCUMENTS

JP 06-129916 A 5/1994
JP 07270632 A * 10/1995

(Continued)

OTHER PUBLICATIONS

Popovic, Milos, Theory and Design of High-Index-Contrast Microphotonic Circuits, Dissertation, Massachusetts Institute of Technology, 2008, available at http://plab.colorado.edu/CVs/popovic-phd-eecs-2008.pdf.*

(Continued)

Primary Examiner — Peter Radkowski
(74) Attorney, Agent, or Firm — Alston & Bird LLP (57) ABSTRACT A differential optical modulator includes, in part, a splitter splitting an incoming optical signal into first and second input signals, a first variable coupler generating a first differential output signal in response to the first input signal, and a second variable coupler generating a second differential output signal in response to the second input signal. The first variable coupler includes, in part, first and second couplers and a phase shifter disposed therebetween. The first coupler generates a pair of internal signals in response to the first input signal. The second coupler generates the first differential output signal. The second variable coupler includes, in part, third and fourth couplers and a phase shifter disposed therebetween. The third coupler generates a pair of internal signals in response to the second input signal. The fourth coupler generates the second differential output signal.

12 Claims, 11 Drawing Sheets

(56) References Cited

U.S. PATENT DOCUMENTS

| | | | | |
|---|---|---|---|---|
| 6,330,098 B1* | 12/2001 | Gopalakrishnan | G02F 1/225 | 359/245 |
| 6,430,936 B1* | 8/2002 | Ghoshal | F25B 23/00 | 62/3.7 |
| 6,449,080 B1* | 9/2002 | McBrien | G02F 1/2255 | 359/245 |
| 6,493,127 B2* | 12/2002 | Gopalakrishnan | G02F 1/2255 | 359/245 |
| 6,665,105 B2* | 12/2003 | Wipiejewski | G02F 1/011 | 359/240 |
| 6,766,083 B2* | 7/2004 | Bona | G02B 6/12007 | 385/32 |
| 6,795,626 B2* | 9/2004 | Shahar | G02F 1/3517 | 359/333 |
| 6,892,016 B2* | 5/2005 | Shahar | G02B 6/125 | 385/122 |
| 7,161,726 B2* | 1/2007 | Bintz | G02F 1/3134 | 359/254 |
| 7,259,901 B2* | 8/2007 | Parsons | H04L 27/223 | 359/237 |
| 7,715,663 B2* | 5/2010 | Carothers | G02F 1/225 | 385/3 |
| 7,848,601 B2* | 12/2010 | Carothers | G02F 1/225 | 385/3 |
| 8,032,027 B2* | 10/2011 | Popovic | G02B 6/12007 | 398/82 |
| 8,054,669 B2* | 11/2011 | Meijer | G02F 1/011 | 365/114 |
| 8,111,730 B2* | 2/2012 | Budd | G02B 6/4201 | 372/36 |
| 8,111,994 B2* | 2/2012 | Popovic | G02B 6/12007 | 359/247 |
| 8,299,608 B2* | 10/2012 | Bartley | H01L 23/055 | 257/712 |
| 8,411,719 B2* | 4/2013 | Budd | G02B 6/4201 | 372/34 |
| 8,483,253 B2* | 7/2013 | Budd | G02B 6/4201 | 372/34 |
| 8,483,521 B2* | 7/2013 | Popovic | G02B 6/29338 | 385/15 |
| 8,582,937 B2* | 11/2013 | Xu | G02F 1/025 | 385/50 |
| 8,610,994 B1* | 12/2013 | Lentine | G02F 1/0147 | 359/279 |
| 8,655,114 B2* | 2/2014 | Popovic | G02B 6/12007 | 385/1 |
| 8,824,036 B2* | 9/2014 | Manipatruni | G02F 1/011 | 359/239 |
| 8,912,017 B2* | 12/2014 | El-Ghoroury | H01L 27/14618 | 257/E21.514 |
| 9,036,737 B2* | 5/2015 | Nilsson | H04L 27/361 | 375/298 |
| 9,134,169 B2* | 9/2015 | Li | G01J 1/0209 | |
| 9,239,477 B2* | 1/2016 | Jiang | G02F 1/3133 | |
| 2002/0089733 A1* | 7/2002 | Gopalakrishnan | G02F 1/2255 | 359/254 |
| 2002/0092307 A1* | 7/2002 | Ghoshal | H01L 23/38 | 62/3.7 |
| 2002/0166839 A1* | 11/2002 | Ghoshal | H01L 35/16 | 216/11 |
| 2003/0025976 A1* | 2/2003 | Wipiejewski | G02F 1/011 | 359/240 |
| 2003/0142928 A1* | 7/2003 | Hirata | G02B 6/4201 | 385/92 |
| 2004/0037524 A1* | 2/2004 | Shahar | G02B 6/125 | 385/122 |
| 2004/0037525 A1* | 2/2004 | Shahar | G02F 1/3517 | 385/122 |
| 2004/0223677 A1* | 11/2004 | Park | G02B 6/1221 | 385/1 |
| 2005/0275921 A1* | 12/2005 | Haus | G02B 6/125 | 359/247 |
| 2006/0056845 A1* | 3/2006 | Parsons | H04L 27/223 | 398/41 |
| 2006/0098910 A1* | 5/2006 | Bintz | G02F 1/3134 | 385/2 |
| 2008/0044184 A1* | 2/2008 | Popovic | G02B 6/12007 | 398/82 |
| 2008/0181332 A1* | 7/2008 | Tian | H04L 27/2032 | 375/308 |
| 2008/0295879 A1* | 12/2008 | Atanackovic | H01L 35/22 | 136/238 |
| 2009/0092350 A1* | 4/2009 | Gill | G02F 1/225 | 385/3 |
| 2009/0277608 A1* | 11/2009 | Kamins | F25D 19/006 | 165/82 |
| 2010/0039848 A1* | 2/2010 | Meijer | G02F 1/011 | 365/114 |
| 2010/0053712 A1* | 3/2010 | Carothers | G02F 1/225 | 359/108 |
| 2010/0157402 A1* | 6/2010 | Carothers | G02F 1/225 | 359/108 |
| 2010/0158429 A1* | 6/2010 | Popovic | G02B 6/12002 | 385/3 |
| 2010/0209038 A1* | 8/2010 | Popovic | G02B 6/12007 | 385/1 |
| 2010/0303122 A1* | 12/2010 | Popovic | G02B 6/29338 | 372/92 |
| 2010/0322569 A1* | 12/2010 | Ohyama | G02B 6/12019 | 385/92 |
| 2011/0044367 A1* | 2/2011 | Budd | G02B 6/4201 | 372/50.21 |
| 2011/0058765 A1* | 3/2011 | Xu | G02F 1/025 | 385/2 |
| 2011/0235962 A1* | 9/2011 | Shubin | G02B 6/12007 | 385/14 |
| 2012/0007229 A1* | 1/2012 | Bartley | H01L 23/055 | 257/712 |
| 2012/0057866 A1* | 3/2012 | McLaren | G02B 6/12007 | 398/25 |
| 2012/0062974 A1* | 3/2012 | Manipatruni | G02F 1/011 | 359/238 |
| 2012/0087659 A1* | 4/2012 | Gill | H04B 10/572 | 398/49 |
| 2012/0120976 A1* | 5/2012 | Budd | G02B 6/4201 | 372/34 |
| 2012/0120978 A1* | 5/2012 | Budd | G02B 6/4201 | 372/50.21 |
| 2012/0155888 A1* | 6/2012 | Ji | G02B 6/30 | 398/182 |
| 2012/0243828 A1* | 9/2012 | Suzuki | G02B 6/12007 | 385/32 |
| 2012/0288995 A1* | 11/2012 | El-Ghoroury | H01L 27/14618 | 438/107 |
| 2013/0044973 A1* | 2/2013 | Akiyama | G02F 1/0121 | 385/2 |
| 2013/0121631 A1* | 5/2013 | Yu | G02F 1/0134 | 385/2 |
| 2013/0223793 A1* | 8/2013 | Kim | G02B 6/3596 | 385/18 |
| 2014/0023309 A1* | 1/2014 | Jiang | G02F 1/3133 | 385/3 |
| 2014/0110572 A1* | 4/2014 | Li | G01J 1/0209 | 250/227.23 |
| 2014/0376662 A1* | 12/2014 | Nilsson | H04L 27/361 | 375/298 |
| 2015/0029569 A1* | 1/2015 | Smith | G02F 1/225 | 359/107 |
| 2016/0124251 A1 | 5/2016 | Zhang | | |
| 2016/0156999 A1* | 6/2016 | Liboiron-Ladouceur | H04Q 11/0005 | 398/51 |
| 2017/0131613 A1 | 5/2017 | Saeedi et al. | | |

FOREIGN PATENT DOCUMENTS

| | | |
|---|---|---|
| JP | 2010-092904 A | 4/2010 |
| JP | 5455955 B2 | 3/2014 |

(56) References Cited

FOREIGN PATENT DOCUMENTS

| JP | 2014-211550 A | 11/2014 |
|---|---|---|
| WO | WO 2016/149289 A1 | 9/2016 |
| WO | WO 2016/191386 A1 | 12/2016 |

OTHER PUBLICATIONS

Listing of Non-Patent Documents, available at http://www.mics.caltech.edu/publications/index.php.*
Shtaif et al., Carrier envelope phase locking of multi-pulse lasers with an intra-cavity Mach-Zehnder interferometer, Optics Express, V. 19, N. 23, p. 23202.*
Sasher et al. Binary phase-shift keying by coupling modulation of microrings, Optics Express, V. 22, N. 17, pp. 20252-20259.*
Atabaki et al., Tuning of resonance-spacing in a traveling-wave resonator device, Apr. 26, 2010 / vol. 18, No. 9 / Optics Express 9447. (Year: 2010).*
Green et al., Optical modulation using anti-crossing between paired amplitude and phase resonators, Dec. 10, 2007 / vol. 15, No. 25 / Optics Express. (Year: 2007).*
Li et al., Silicon microring carrier-injection-based modulators/switches with tunable extinction ratios and OR-logic switching by using waveguide cross-coupling, Apr. 16, 2007 / vol. 15, No. 8 / Optics Express (Year: 2007).*
Martínez-Llinàs et al., Tuning the period of square-wave oscillations for delay-coupled optoelectronic systems. Physical Review E. 89. 042908. 10.1103/PhysRevE.89.042908, 2014 (Year: 2014).*
PCT International Search Report and Written Opinion of the International Searching Authority for application PCT/US2016/033813 dated Aug. 29, 2016.
PCT International Search Report and Written Opinion of the International Searching Authority for application PCT/US2016/022504 dated Jun. 21, 2016.
Novack, et al., "A 30 GHz Silicon Photonic Platform," SPIE Optics + Optoelectronics, International Society Optics and Photonics, (2013).
Sacher, et al., "Coupling modulation of microrings at rates beyond the linewidth limit," Optics Express, 21(8):9722-9733, (2013):.
Sacher, et al., "Dynamics of microring resonator modulators," Optics Express, 16(20):15741-15753, (2008).
Xu, et al., "Micrometre-scale silicon electro-optic modulator," Nature, 435(7040):325-327, (2005).
PCT International Preliminary Report on Patentability for application PCT/US2016/022504 dated Sep. 19, 2017.
PCT International Preliminary Report on Patentability for application PCT/US2016/033813 dated Nov. 28, 2017.
U.S. Appl. No. 15/162,163, Non-Final Office Action dated Aug. 11, 2017.
U.S. Appl. No. 15/162,163, Final Office Action dated Jun. 14, 2018.
U.S. Appl. No. 15/162,163, Response to Non-Final Office Action filed Feb. 12, 2018.
U.S. Appl. No. 15/162,163, Non-Final Office Action dated Feb. 25, 2019.
U.S. Appl. No. 15/162,163, Response to Final Office Action filed Dec. 13, 2018.
U.S. Appl. No. 15/162,163, Notice of Allowance dated Sep. 24, 2019.

* cited by examiner

DIFFERENTIAL RING MODULATOR

CROSS REFERENCE TO RELATED APPLICATIONS

The present application claims benefit under 35 USC 119 (e) of U.S. provisional Application No. 62/133,849, filed Mar. 16, 2015, entitled "Differential Ring Modulator", the content of which is incorporated herein by reference in its entirety.

FIELD OF THE INVENTION

The present invention relates to optoelectronic devices, and more particularly to optical ring modulators.

BACKGROUND OF THE INVENTION

Electro-optic modulators (EOM) are commonly used in optical communication networks. A phase-modulating EOM may be used in a Mach-Zehnder interferometer to modulate the amplitude of an incoming optical signal. As is known, Mach-Zehnder based opto-electronic modulators have a relatively high power consumption, are large and require a high drive voltage.

Improving the bandwidth-density product in an integrated silicon photonic system requires a corresponding improvement in the performance of the optical modulator disposed in such a system. Optical modulation in conventional optical ring modulators is achieved either by varying the coupling level or by changing the index of refraction of the ring, either by injecting excess minority carriers in the associated PIN junction or by changing the reverse bias voltage applied to the PN junction. The change in the index of refraction causes a change in the optical path length of the ring, in turn changing the resonance frequency of the ring.

As is well known, conventional optical ring modulators are susceptible to temperature fluctuations. Furthermore, as the Quality factor (Q) of a conventional optical ring modulator increases to achieve lower power consumption and enhanced energy efficiency, the bandwidth of the optical ring modulator decreases. In other words, there is a trade-off between the optical bandwidth and power consumption of a conventional optical ring modulator.

Figure 1A:
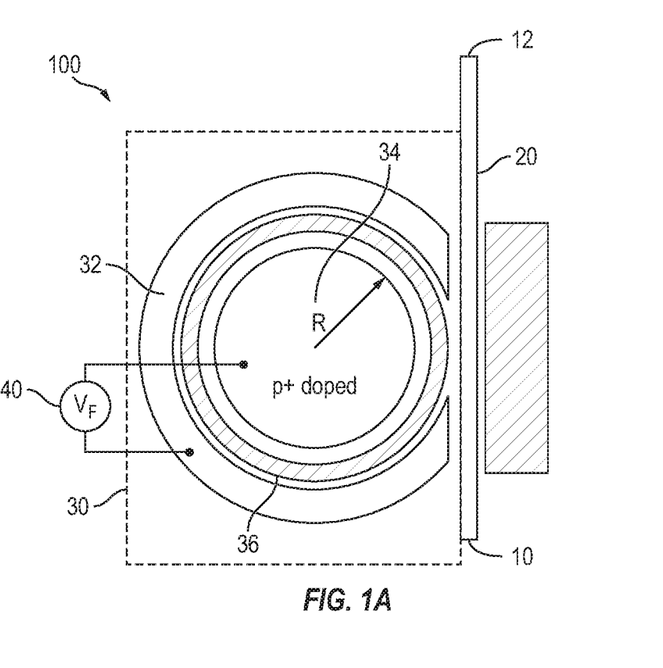
FIG. 1A is a top schematic view of an optical ring modulator as known in the prior art.

FIG. 1A is a top schematic view of an optical ring modulator 100, as known in the prior art. Optical ring modulator 100 is shown as including, in part, a waveguide 20, and an optical ring 30. The optical signal entering waveguide 20 through its input port 10 is coupled to optical ring 30.

Figure 1B:
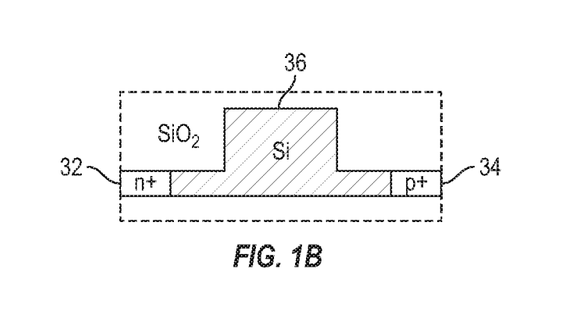
FIG. 1B is a cross-section view of the optical ring modulator of FIG. 1A.
Figure 1C:
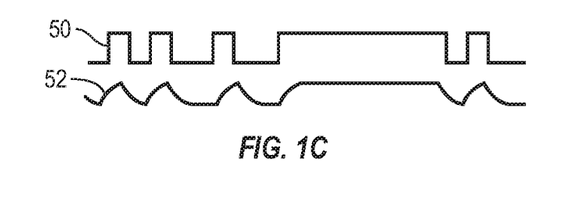
FIG. 1C shows an example of the input/output optical signals of the optical ring modulator of FIG. 1A.

Optical ring 30 includes an intrinsic silicon region 36, a highly doped n+ region 32 encompassing silicon region 36, and a highly doped p+ region 34 formed within the inner area of silicon region 36. FIG. 1B is a cross-section view of optical ring 30 showing intrinsic silicon region 36, and the highly doped n+ and p+ regions 32 and 34, respectively. By changing the voltage applied between n+ region 32 and p+ region 34, the refractive index of the optical ring 30 is varied. The interference between the optical signals travelling through waveguide 20 and optical ring 30 modulates the optical signal at the output port 12 of optical ring modulator 100. Referring to FIG. 1C, signals 50 (delivered via input port 10) and 52 (delivered via output port 20) are exemplary input and output signals of the optical modulator shown in FIG. 1A.

The time-domain dynamic transmission of the ring modulator, T(t) may be defined as:

$$T(t) = \sigma(t) + \frac{k(t)}{k(t-\tau)}\alpha(t)\exp[-i\varphi(t)][\sigma(t-\tau)T(t-\tau)-1] \quad (1)$$

where $\sigma$ and $\kappa$ respectively represent transmission and coupling coefficients of the optical ring modulator, $\alpha$ represents the attenuation level, $\varphi$ represents the phase shift inside the ring, and $\tau$ represents the travel time of the optical signal around the resonator, i.e., the round trip time in the resonator.

Figure 2A:
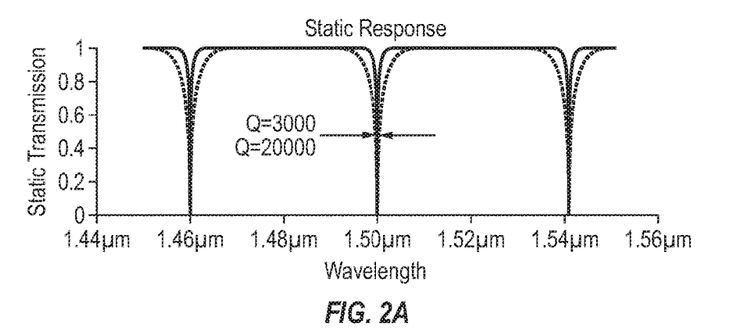
FIG. 2A shows an example of the static transmission characteristic of a conventional optical ring modulator.
Figure 2B:
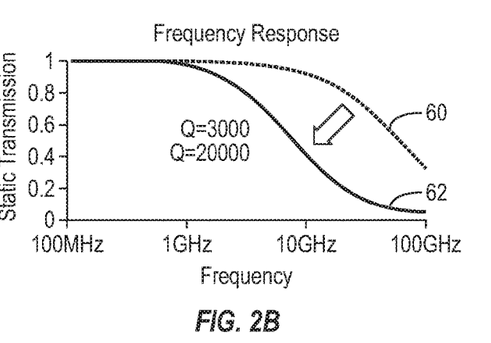
FIG. 2B shows the frequency responses as a functions of the Q of a conventional optical ring modulator.
Figure 2C:
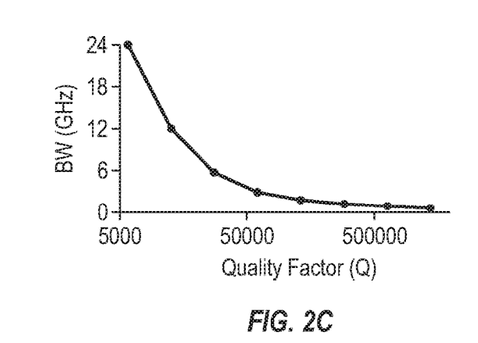
FIG. 2C shows the drop-off in the frequency response as a function of the Q of a conventional optical ring modulator.

FIG. 2A shows the static transmission characteristic of a conventional optical ring modulator obtained through numerical solution of expression (1) using an iterative approach. FIG. 2B shows the Q-bandwidth response of such an optical ring modulator. Plots 60 and 62 of FIG. 2B respectively correspond to conventional optical modulators having Qs 3000 and 20000 respectively. It is seen that the modulator with a Q of 3000 has a wider bandwidth. FIG. 2C also shows the drop-off in the frequency response as the Q of the modulator increases. Referring concurrently to FIGS. 1C and 2C, it is seen that a conventional optical modulator, such as that shown in FIG. 1A, has a low-pass response.

Figure 2D:
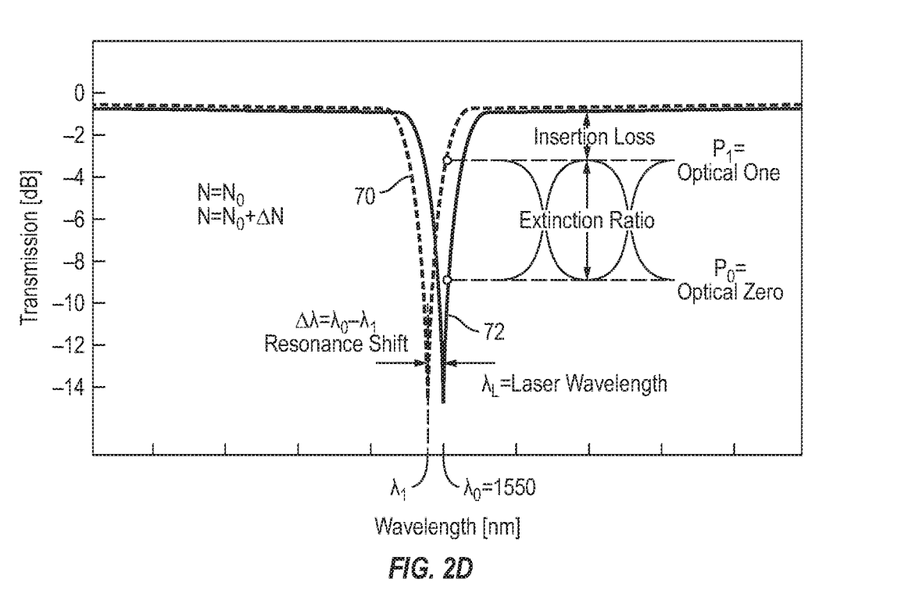
FIG. 2D shows an example of the static transmission characteristic of a conventional optical ring modulator.

FIG. 2D shows the static transmission characteristic of another exemplary optical ring modulator that receives an optical signal generated using a laser having a wavelength of nearly 1527.4 nm, as shown. Plots 70 and 72 respectively show the static transmission characteristic of the optical ring modulator for two different reverse-biased voltages. By changing the reverse-biased voltage of the P-N junction disposed in the ring, the index of refraction of the ring and hence the optical length of the ring changes, thereby resulting in a shift in the resonance frequency of the ring. In plot 70, the resonance frequency is shown to occur at wavelength of nearly 1527.2 nm associated with a reverse bias voltage of $V_1$. In plot 72, the resonance frequency is shown to occur at wavelength of nearly 1527.3 nm associated with a reverse bias voltage of $V_2$. The modulator's transmission value is seen to change from −9 dB (associated with an optical output of zero) to −3 dB (associated with an optical value of one) defining an extinction ratio of 6 dB. In other words, a change of $\pm(V_2-V_1)$ in the voltage applied to the reverse-biased p-n junction disposed in the modulator causes the optical output signal of the modulator to switch between one and zero.

Figure 3A:
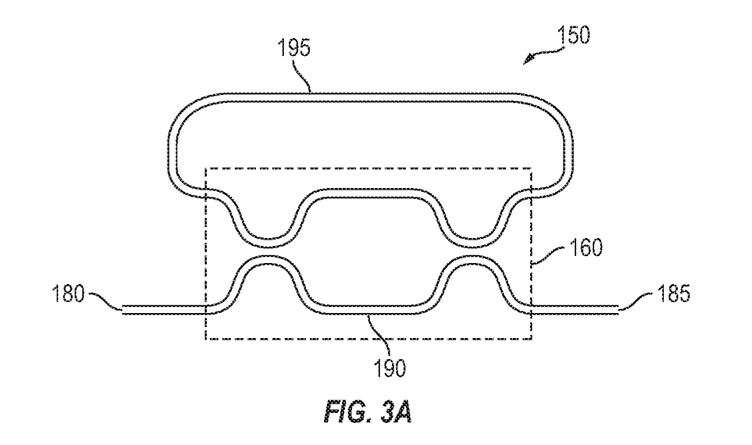
FIG. 3A is top schematic diagram of an optical modulator having a variable coupler as is known in the prior art.
Figure 3B:
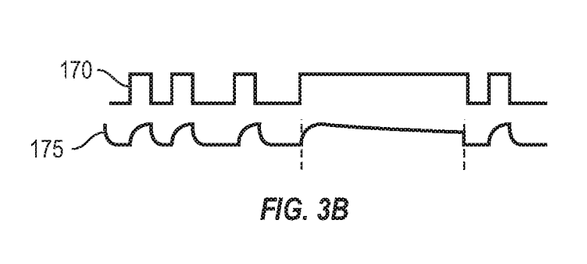
FIG. 3B is an example of the input/output optical signals of the optical ring modulator of FIG. 3A.

FIG. 3A shows a schematic diagram of an optical modulator 150 that includes a variable coupler 160, as is also known in the prior art. FIG. 3B shows exemplary input/output signals of optical modulator 150. Output signal 175 supplied at output port 185 of optical ring modulator 200 is generated in response to optical input signal 170 delivered to input port 180 of the modulator. The modulation of optical signal 185 is achieved by changing the coupling ratio between optical path 190 of the modulator and optical path of 195 of the ring using variable coupler 160. As is seen from FIG. 3B, the relatively long sequence of input is at the input port of the optical modulator causes an energy droop in the ring and output signal degradation. Accordingly, optical modulator 150 may be characterized as having a highpass response. A need continues to exist for an improved optical ring modulator.

BRIEF SUMMARY OF THE INVENTION

A differential optical modulator, in accordance with one embodiment of the present invention includes, in part, a splitter and a pair of variable optical couplers. The splitter is adapted to split an incoming optical signal into first and second input signals. A first one of the variable couplers is adapted to generate a first differential output of the optical modulator in response to the first input signal. A second one of the variable couplers is adapted to generate a second differential output of the optical modulator in response to the second input signal. The first variable coupler is further adapted to generate a first internal signal applied to the second variable coupler, and the second variable coupler is further adapted to generate a second internal signal applied to the first variable coupler.

In one embodiment, the first variable coupler includes, in part, first and second couplers and a first phase shifter disposed between the first and second couplers. The first coupler is adapted to generate third and fourth internal signals in response to the first input signal and the second internal signal. The second coupler is adapted to generate the first differential output signal and the first internal signal in response to the first coupler.

In one embodiment, the second variable coupler includes, in part, third and fourth couplers and a first phase shifter disposed between the third and fourth couplers. The third coupler is adapted to generate fifth and sixth internal signals in response to the second input signal and the first internal signal. The fourth coupler is adapted to generate the second differential output signal and the second internal signal in response to the third coupler. In one embodiment, the differential optical modulator further includes, in part, a thermal phase shifter adapted to match phases of the first and second input signals. In one embodiment, each of the first and second phase shifters includes, in part, a p-n junction adapted to vary the phase shifter's optical length in response to a voltage applied thereto. In one embodiment, the second phase shifter receives a complement of a first voltage applied to the first phase shifter.

In one embodiment, the first variable coupler includes, in part, a third phase shifter disposed between the first and second couplers. In one embodiment, the second variable coupler includes, in part, a fourth phase shifter disposed between the third and fourth couplers. In one embodiment, each of the third and fourth phase shifters includes, in part, a p-n junction adapted to vary the phase shifter's optical length in response to a voltage applied to the phase shifter.

In one embodiment, the third phase shifter receives the first voltage and the fourth phase shifter receives the complement of the first voltage. In one embodiment, each of the first, second, third and fourth couplers is a 3-dB coupler. In one embodiment, each of the first and second variable couplers has an associated optical ring. In such embodiments, at any given point in time either the first variable coupler couples the optical power it receives to the first coupler's associated ring, or the second variable coupler couples the optical power it receives to the second coupler's associated ring.

A method of modulating an incoming optical signal, in accordance with one embodiment of the present invention includes, in part, splitting the incoming optical signal into first and second input signals, generating a first optically modulated differential output signal in response to the first input signal, and generating a second optically modulated differential output signal in response to the second input signal. In one embodiment, the first optically modulated differential output signal is generated by a first coupler, and the second optically modulated differential output signal is generated by a second coupler. In such embodiments, the first coupler is responsive to the second coupler, and the second coupler is responsive to the first coupler.

In one embodiment, the method of modulating the incoming optical signal, further includes, in part, generating first and second internal signals using a third coupler responsive to the second coupler, and generating third and fourth internal signals using a fourth coupler responsive to the first coupler. In one embodiment, the method of modulating the incoming optical signal, further includes, in part, delaying the phase of the first internal signal to generate a first delayed signal, and applying the first delayed signal to the first coupler. The method further includes, in part, delaying the phase of the fourth internal signal to generate a second delayed signal, and applying the second delayed signal to the second coupler. In one embodiment, the method further includes, in part, generating the first delayed signal in response to a first voltage, and generating the second delayed signal in response to a complement of the first voltage.

In one embodiment, the method further includes, in part, delaying the phase of the second signal to generate a third delayed signal, and applying the third delayed signal to the first coupler. The method further includes, in part, delaying the phase of the third signal to generate a fourth delayed signal, and applying the fourth delayed signal to the second coupler.

In one embodiment, the method further includes, in part, generating the third delayed signal in response to the complement of the first voltage, and generating the fourth delayed signal in response to the first voltage. In one embodiment, each of the first, second, third and fourth couplers is a 3-dB coupler. In one embodiment, each of the first and second variable couplers has an associated optical ring. In such embodiments, at any given point in time, either the first variable coupler couples the optical power it receives to the first coupler's associated ring, or the second variable coupler couples the optical power it receives to the second coupler's associated ring.

DETAILED DESCRIPTION OF THE INVENTION

Figure 4A:
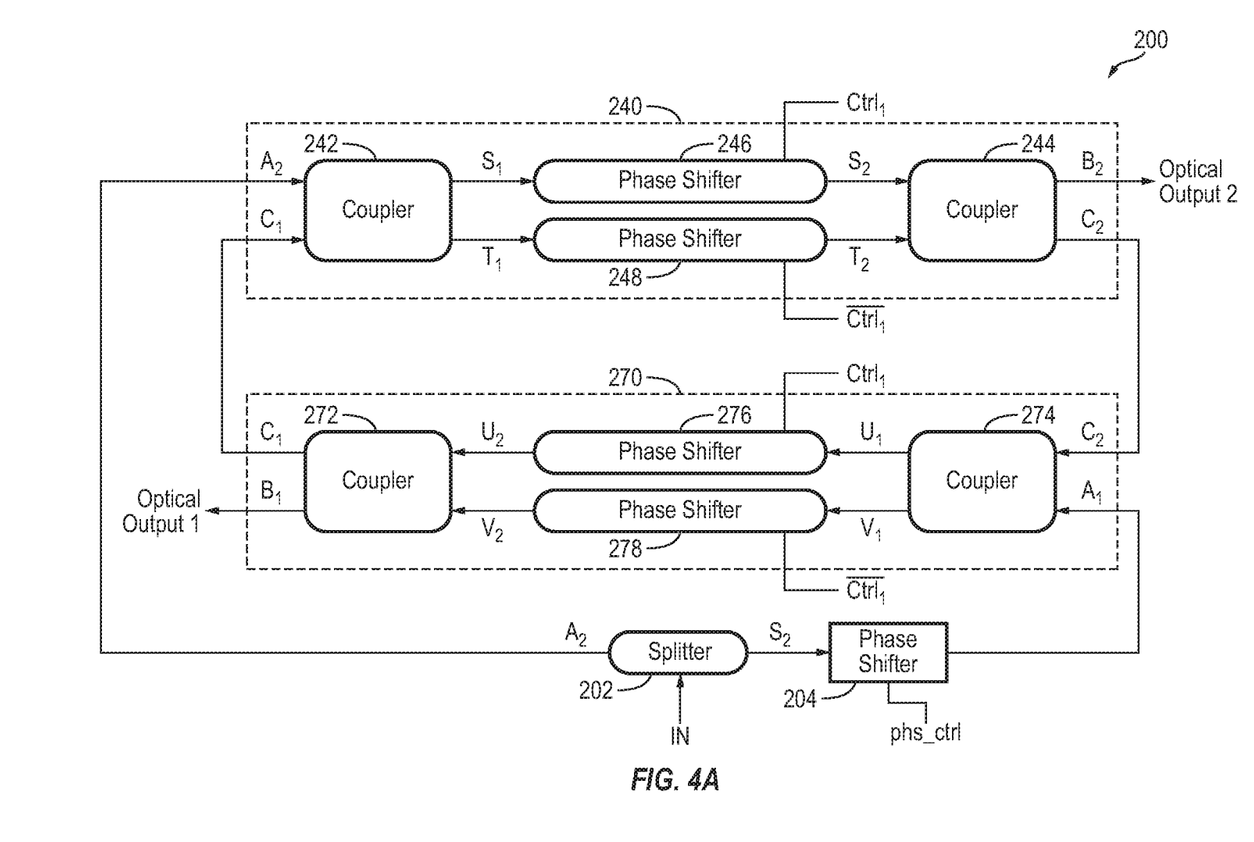
FIG. 4A is a simplified high-level block diagram of a differential optical ring modulator, in accordance with one embodiment of the present invention.

FIG. 4A is a simplified high-level block diagram of a differential optical ring modulator 200, in accordance with one embodiment of the present invention. Differential optical ring modulator (hereinafter alternatively referred to as modulator) 200 is shown as including, in part, a splitter (such as a Y-junction splitter) 202, a phase shifter 204, and a pair of variable couplers 240, 270. Variable couplers 240, 270 are adapted to operate out of phase and as such when the coupling level of variable coupler 240 increases, the coupling level of variable coupler 270 decreases. Conversely, when the coupling level of variable coupler 240 decreases, the coupling level of variable coupler 270 increases.

Variable coupler 240 is shown as including, in part, couplers 242, 244, and phase shifters 246, 248. Variable coupler 270 is shown as including, in part, couplers 272, 274, and phase shifters 276, 278. In one embodiment, each of couplers 242, 244, 272 and 274 is a 3 dB-coupler.

Optical signal IN received by splitter 202 is split into optical signals $A_2$ and $S_2$. Optical signal (hereinafter alternatively referred to as signal) $A_2$ is delivered to coupler 242. Phase shifter 204 is adapted to vary the phase of signal $S_2$ and generate a phase-shifted signal $A_1$. The degree of phase shift introduced by phase shifter 204 is such that the phase of signal $A_2$ at the input of coupler 242 matches the phase of signal $A_1$ at the input of coupler 274. In one embodiment, phase shifter 204 may be a thermal phase shifter that generates a phase shift by changing its temperature via signal Phs_Ctrl.

As is seen from FIG. 4A, coupler 274 also receives signal $C_2$ supplied thereto by coupler 244. In response coupler 274 generates signals $U_1$ and $V_1$. In one embodiment, signals $U_1$ and $V_1$ have amplitudes and phases defined by the amplitudes and phases of signals $A_1$ and $C_2$, as shown below:

$$\begin{pmatrix} U_1 \\ V_1 \end{pmatrix} = \begin{pmatrix} \sqrt{1-\alpha} & j\sqrt{\alpha} \\ j\sqrt{\alpha} & \sqrt{1-\alpha} \end{pmatrix} \begin{pmatrix} C_2 \\ A_1 \end{pmatrix}$$

where α has a value of 0.5 for a 3 dB directional coupler.

Optical phase shifters 276 and 278 form a first differential phase shifter adapted to receive and delay phases of signals $U_1$ and $V_1$ by $$\frac{\Delta\varphi}{2} \text{ and } -\frac{\Delta\varphi}{2}$$

respectively. Accordingly, signals $U_2$ and $V_2$ generated by phase shifter 276, 278 have a relative phase shift of Δφ. The phase delay $$\frac{\Delta\varphi}{2}$$

generated by phase shifter 276 may be changed by varying the voltage signal $Ctrl_1$ applied across the reverse-biased P-N junction (not shown) disposed in phase shifter 276. In a similar manner, voltage signal $\overline{Ctrl_1}$ applied to phase shifter 278 is used to vary the phase $$-\frac{\Delta\varphi}{2}$$

associated with optical signal $U_2$. In the embodiment shown in FIG. 4A, voltage signals $Ctrl_1$ and $\overline{Ctrl_1}$ are complementary signals.

Coupler 272 is adapted to receive signal $U_2$, $V_2$ and generate signals $C_1$, $B_1$ in response. Signals $C_1$, $B_1$ have equal amplitudes defined by the amplitudes of signals $U_2$ and $V_2$. Signal $B_1$ is a first differential optical output signal of differential optical modulator 200. In one embodiment, signals $C_1$ and $B_1$ have amplitudes and phases defined by the amplitudes and phases of signals $U_2$ and $V_2$, as shown below:

$$\begin{pmatrix} C_1 \\ B_1 \end{pmatrix} = \begin{pmatrix} \sqrt{1-\alpha} & j\sqrt{\alpha} \\ j\sqrt{\alpha} & \sqrt{1-\alpha} \end{pmatrix} \begin{pmatrix} U_2 \\ V_2 \end{pmatrix}$$

where α has a value of 0.5 for a 3 dB directional coupler.

Coupler 242 receives signals $C_1$ and $A_2$ and in response generates output signals $S_1$ and $T_1$. Signals $S_1$ and $T_1$ have equal amplitudes defined by the amplitudes of signals $A_2$ and $C_1$. In one embodiment, signals $S_1$ and $T_1$ have amplitudes and phases defined by the amplitudes and phases of signals $A_2$ and $C_1$, as shown below:

$$\begin{pmatrix} S_1 \\ T_1 \end{pmatrix} = \begin{pmatrix} \sqrt{1-\alpha} & j\sqrt{\alpha} \\ j\sqrt{\alpha} & \sqrt{1-\alpha} \end{pmatrix} \begin{pmatrix} A_2 \\ C_1 \end{pmatrix}$$

where α has a value of 0.5 for a 3 dB directional coupler.

Optical phase shifters 246 and 248 form a second differential phase shifter adapted to receive and delay phases of signals $S_1$ and $T_1$ by $$\frac{\Delta\varphi}{2} \text{ and } -\frac{\Delta\varphi}{2}$$

respectively. Accordingly, signals $S_2$ and $T_2$ generated by phase shifter 246, 248 have a relative phase shift of Δφ. The phase delay generated by phase shifter 246 may be changed by varying the voltage signal $Ctrl_1$ applied across the reverse-biased P-N junction disposed in phase shifter 246. In a similar manner, voltage signal $\overline{Ctrl_1}$ applied to phase shifter 248 is used to vary the phase $$-\frac{\Delta\varphi}{2}$$

associated with optical signal $T_2$.

In one embodiment, each of the phase shifters 246, 248, 276, and 278 is an optical waveguide having a p-n junction. By changing the voltage used to reverse bias each such p-n junction (using either voltage $Ctrl_1$ or $\overline{Ctrl_1}$), the refractive index and hence the length of the optical path through which the associated optical signal travels is varied, thereby generating the required phase shift.

Coupler 244 is adapted to receive signal $S_2$, $T_2$ and generate signals $C_2$, $B_2$ in response. Signals $C_2$ and $B_2$ have equal amplitudes defined by the amplitudes of signals $S_2$ and $T_2$. Signal $B_2$ is a second differential optical output signal of differential optical modulator 200. Since signals $B_1$ and $B_2$ are differential optical signals, when signal $B_1$ has a value of one, signal $B_2$ has a value of zero. Conversely, when signal $B_1$ has a value of zero, signal $B_2$ has a value of one. In one embodiment, signals $B_2$ and $C_2$ have amplitudes and phases defined by the amplitudes and phases of signals $S_2$ and $T_2$, as shown below:

$$\begin{pmatrix} B_2 \\ C_2 \end{pmatrix} = \begin{pmatrix} \sqrt{1-\alpha} & j\sqrt{\alpha} \\ j\sqrt{\alpha} & \sqrt{1-\alpha} \end{pmatrix} \begin{pmatrix} S_2 \\ T_2 \end{pmatrix}$$

where $\alpha$ has a value of 0.5 for a 3 dB directional coupler.

Differential optical ring modulator 200 has a substantially lower $V_\pi$ compared to a conventional MZI modulator, where $V_\pi$ is defined as the voltage required to achieve a differential phase shift $\Delta\varphi$ of $\pi$ either between phase shifters 276, 278, or between phase shifters 246, 248. At resonance, the static transmission characteristic of differential optical ring modulator 200 may be defined by the following expression:

$$\left|\frac{B_1}{A_1}\right|^2 = \frac{\left(a - \left|\cos\frac{\Delta\varphi}{2}\right|\right)^2}{\left(1 - a\left|\cos\frac{\Delta\varphi}{2}\right|\right)^2} = \frac{\left(a - \left|\cos\frac{V}{2V_x}\pi\right|\right)^2}{\left(1 - a\left|\cos\frac{V}{2V_x}\pi\right|\right)^2} \quad (2)$$

where $\alpha$ is the loss factor and V is the voltage required to achieve a differential phase shift $\Delta\varphi$ of $\pi$ either between phase shifters 276, 278, or between phase shifters 246, 248.

Critical coupling, defined as the point at which $$\frac{B_1}{A_1}$$

has a value of zero (i.e., to achieve a substantially maximum extinction ratio such that $B_2/B_1$ is 1/0 or 0/1) occurs when the voltage applied to the phase shifters has the following value:

$$V_{\pi,DRM} = \frac{2V_\pi}{\pi}\cos^{-1}(a) \quad (3)$$

Therefore, for a Q of 32,000 (giving rise to a of about 0.98) $V_{\pi,DRM}$ is approximately 8 times smaller than $V_\pi$.

The amplitudes of signals $C_1$ and $C_2$ when the differential output data switches from 1 to 0 or vice versa may be defined as:

$$|C_1|^2|_{Data=0} = |C_1|^2|_{Data=1} = \quad (4)$$

$$|C_2|^2|_{Data=0} = |C_2|^2|_{Data=0} = \frac{\sin\frac{\Delta\Phi}{2}\left(1 + \frac{a^2}{4}\cos^2\frac{\Delta\Phi}{2}\right)}{\left(1 - \frac{a^2}{4}\cos^2\frac{\Delta\Phi}{2}\right)}$$

As is seen from expression (4), differential optical ring modulator 200 maintains the energy stored in its ring substantially constant. In other words, for any given $\Delta\varphi$, the square of the amplitudes of signals $C_1$ and $C_2$ remain constant as the differential output data $B_1/B_2$ is changed from 1 to 0 or vice versa. Consequently, by modulating couplers 240 and 270 differentially, the overall coupling in the ring remains substantially constant, thereby minimizing the energy variation stored in the optical ring modulator.

Figure 4B:
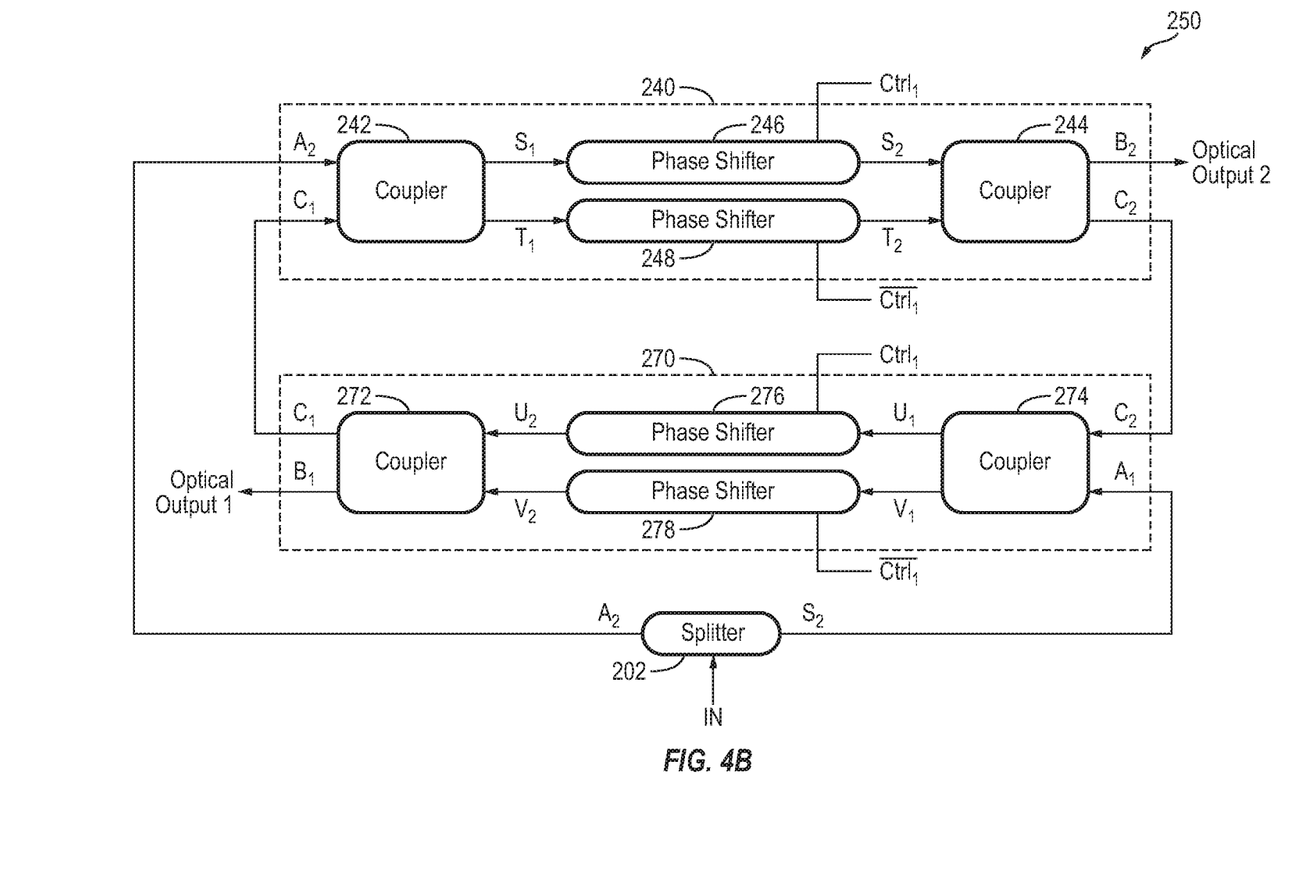
FIG. 4B is a simplified high-level block diagram of a differential optical ring modulator, in accordance with another embodiment of the present invention.

FIG. 4B is a simplified high-level block diagram of a differential optical ring modulator 250, in accordance with another embodiment of the present invention. Differential optical ring modulator 250 is similar to differential optical modulator 200 except that differential optical modulator 250 does not include a thermal phase shifter 204. Accordingly, in differential optical ring modulator 250, phase matching between signals $A_1$ and $A_2$ is achieved geometrically by matching the lengths of the optical paths through which signals $A_1$ and $A_2$ travel.

Figure 5:
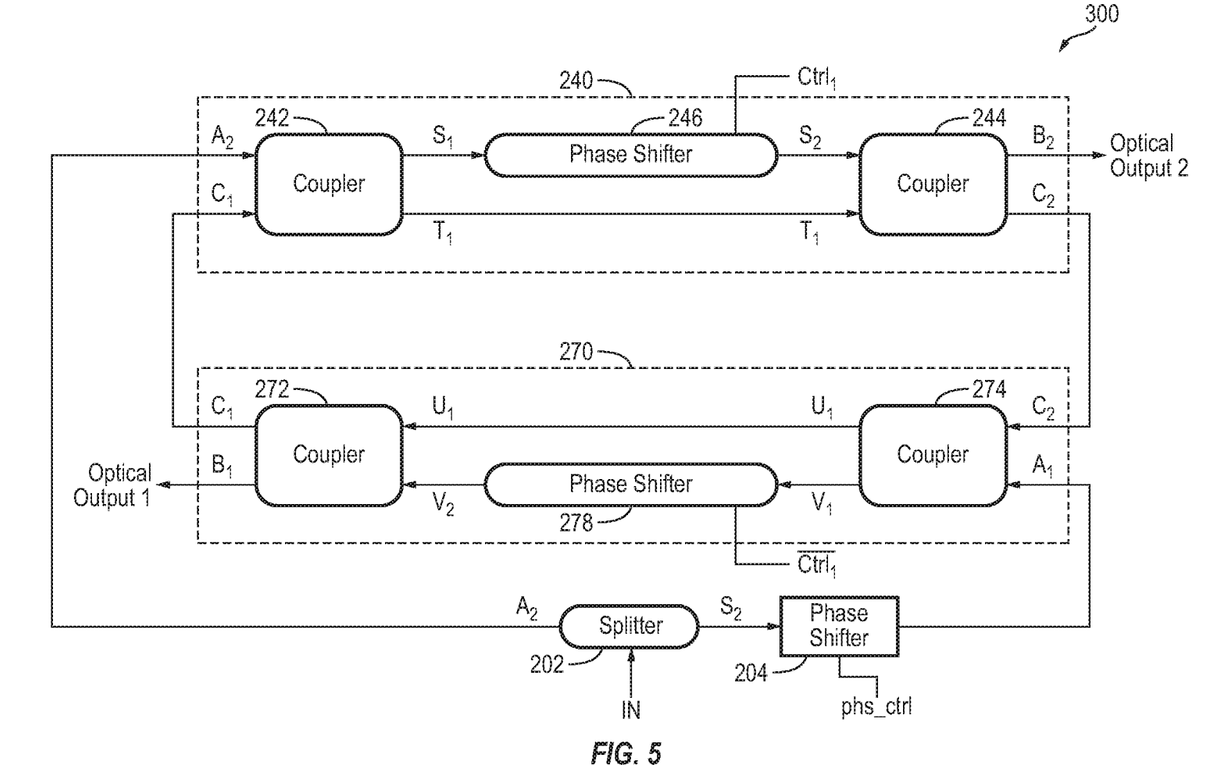
FIG. 5 is a simplified high-level block diagram of a differential optical ring modulator, in accordance with another embodiment of the present invention.

FIG. 5 is a simplified high-level block diagram of a differential optical ring modulator 300, in accordance with another embodiment of the present invention. Differential optical ring modulator 300 is similar to differential optical ring modulator 200 except that in differential optical ring modulator 300 each of variable couplers 240 and 270 includes only a single phase shifter. Accordingly, in optical ring modulator 300, the phase difference between optical signals $U_1$ and $V_2$ at the input ports of coupler 272 is controlled by the voltage applied to phase shifter 278 via signal $\overline{Ctrl_1}$. Likewise, the phase difference between optical signals $S_2$ and $T_1$ at the input ports of coupler 244 is controlled by the voltage applied to phase shifter 246 via signal $Ctrl_1$.

Figure 6:
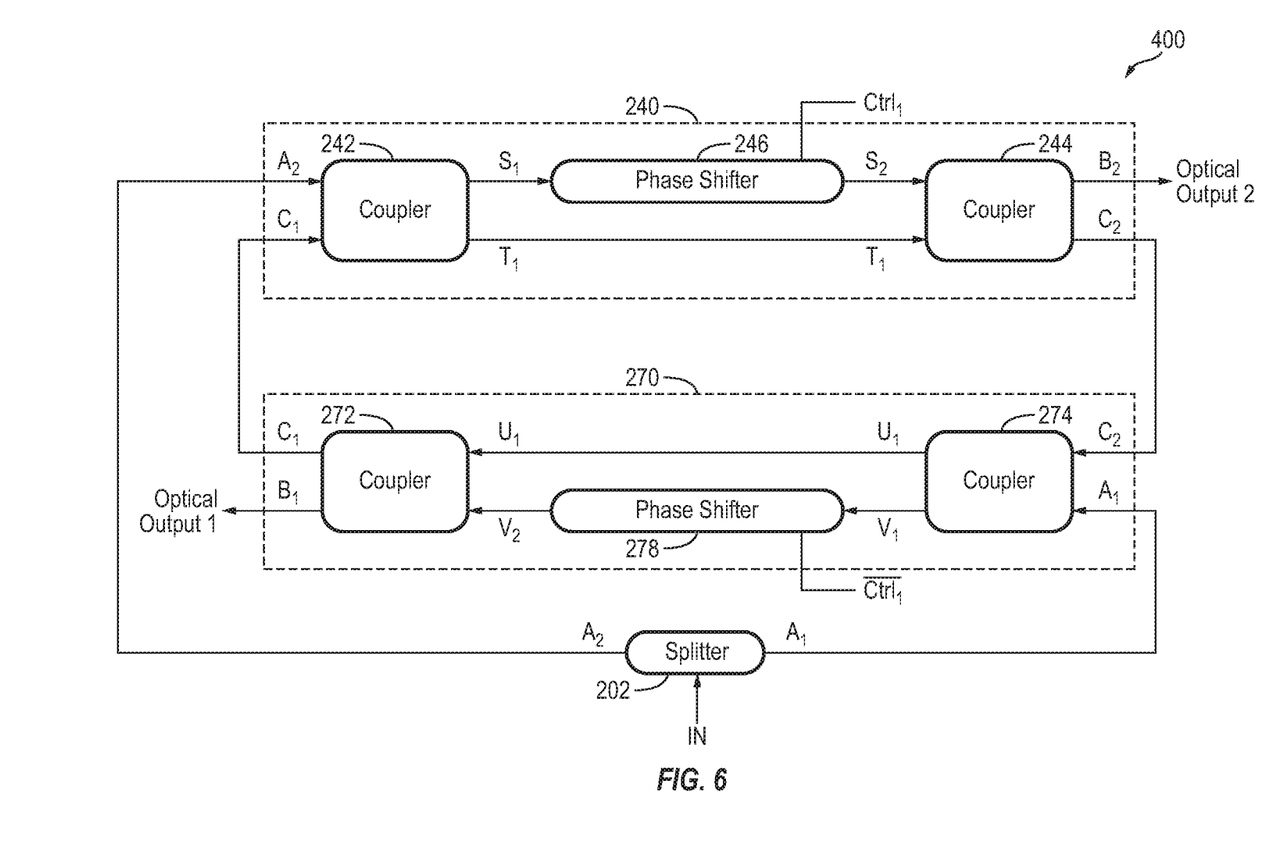
FIG. 6 is a simplified high-level block diagram of a differential optical ring modulator, in accordance with another embodiment of the present invention.

FIG. 6 is a simplified high-level block diagram of a differential optical ring modulator 400, in accordance with another embodiment of the present invention. Differential Optical ring modulator 400 is similar to differential optical ring modulator 300 except that differential optical ring modulator 400 does not have a thermal phase shifter. Accordingly, in differential optical ring modulator 400, phase matching between signals $A_1$ and $A_2$ is achieved geometrically by matching the lengths of the optical paths through which signals $A_1$ and $A_2$ travel.

Figure 7:
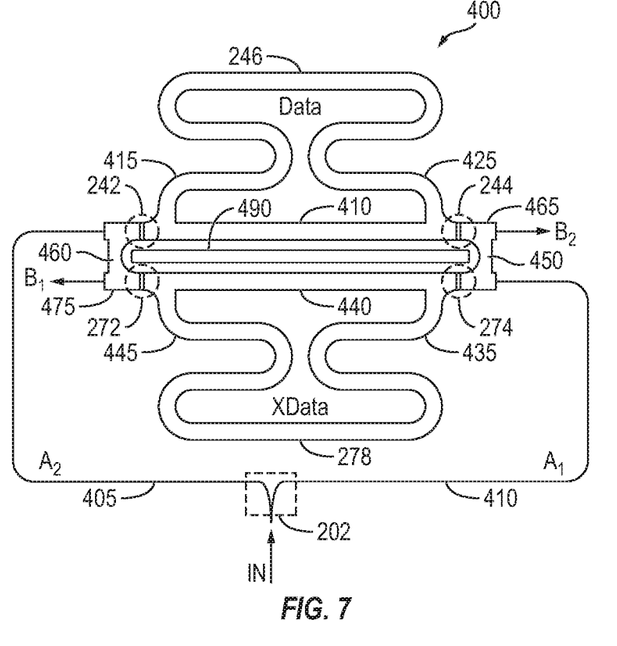
FIG. 7 is a top layout view of the optical modulator of FIG. 6, in accordance with one embodiment of the present invention.

FIG. 7 is a top layout view of the differential optical modulator 400 shown in FIG. 6, in accordance with one embodiment of the present invention. Y-junction 202 splits the incoming optical signal IN into two optical signals $A_1$ and $A_2$ that are delivered respectively to optical paths (also referred to herein as optical links or waveguides) 405 and 410. For simplicity and clarity, the remaining signal names shown in FIG. 6 are not shown in FIG. 7.

The optical signal travelling through optical path 405 is delivered to 3 dB coupler 242. Coupler 242 receives the output signal of 3 dB coupler (also referred as coupler) 272 via its second input port. A first output signal ($S_1$) of coupler 242 is delivered to phase shifter 246 via optical path 415. A second output signal ($T_1$) of coupler 242 is delivered to coupler 244 via optical path 410. Coupler 244 is also shown as being coupled to the output port of phase shifter 246 via optical path 425.

Coupler 244 generates a first differential optical output signal $B_2$ of the modulator via its first output terminal 465. A second optical output signal ($C_2$) of coupler 244 is delivered to coupler 274 via optical path 450. In response to these received signals, coupler 274 generates and delivers a first optical signal ($U_1$) to coupler 272 via optical path 440, and a second optical signal ($V_1$) to phase shifter 278 via optical path 435. The phase-shifted output signal of phase shifter 278 is delivered to coupler 242 via optical path 445. Coupler 272 generates a second differential optical output signal $B_1$ of the modulator via its first output terminal 475. A second output signal of coupler 272 is delivered to coupler 274 via optical path 460. Both phase shifters 246 and 278 include a positively doped (P) region and a negatively doped region (N). By controlling the reverse voltage applied between each such P-N junction, the magnitude of the phase shift generated by the phase shifter may be varied. Accordingly, by varying the voltages applied to phases shifters 246 and 278, the differential output signals $B_1$ and $B_2$ are changed such that when signal $B_1$ has an optical value of one, signal $B_2$ has an optical value of zero, and vice versa. Differential optical modulator is also shown as including a resistive heating element 490 used to thermally heat differential optical modulator 400 so as to account for process variations that occur during manufacturing of the differential optical modulator. By changing the voltage applied to heating element 490, the notch frequency of the ring is matched to the frequency of the laser.

Figure 8:
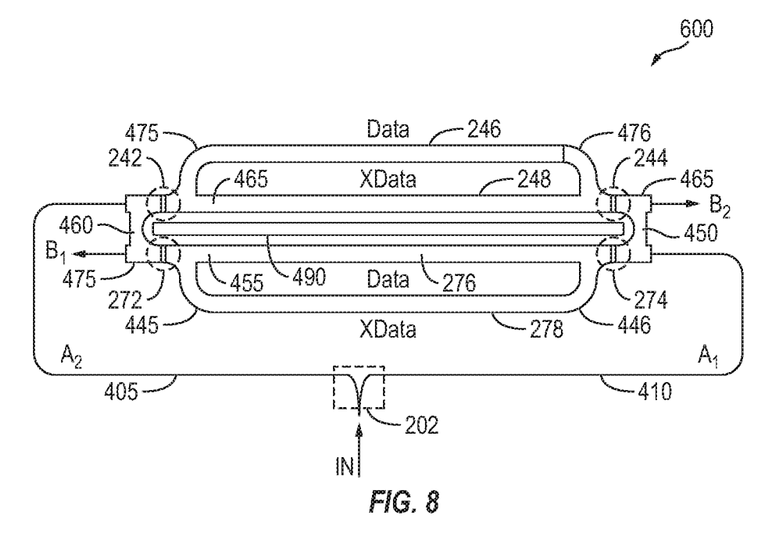
FIG. 8 is a top layout view of the optical modulator of FIG. 4B, in accordance with one embodiment of the present invention.

FIG. 8 is a top layout view of the optical modulator 250 shown in FIG. 4B, in accordance with one embodiment of the present invention. Y-junction 202 splits the incoming optical signal IN into two optical signals $A_1$ and $A_2$ that are delivered respectively to optical paths 405 and 410. For simplicity and clarity, the remaining signal names shown in FIG. 4B are not shown in FIG. 8.

The optical signal ($A_2$) travelling through optical path 405 is delivered to 3 dB coupler 242. Coupler 242 receives the output signal ($C_1$) of 3 dB coupler 272 via its second input port. A first output signal ($S_1$) of coupler 242 is delivered to phase shifter 246 via optical path 475. A second output signal ($T_1$) of coupler 242 is delivered to coupler 244 via phase shifter 248. Coupler 244 is also shown as being coupled to the output port of phase shifter 246 via optical path 476.

Coupler 244 generates a first optical output signal ($B_2$) of the differential modulator via its first output terminal 465. A second optical output signal ($C_2$) of coupler 244 is delivered to coupler 274 via optical path 450. In response to receiving these two signals, coupler 274 generates and delivers a pair of optical signals ($U_1$, $V_1$) to coupler 272 via optical phase shifters 276 and 278 respectively. Coupler 272 generates a second optical output signal $B_1$ of the differential modulator via its first output terminal 475. A second optical output signal ($C_1$) of coupler 272 is delivered to coupler 242 via optical path 460. Each of phase shifters 246, 248, 276 and 278 includes a positively doped (P) region and a negatively doped region (N). By controlling the reverse voltage applied between each such P-N junction, the magnitude of the phase shift generated by the phase shifter may be varied. Accordingly, by varying the voltages applied to the phases shifters, the differential output signals $B_1$ and $B_2$ are changed such that when $B_1$ has an optical value of one, $B_2$ has an optical value of zero, and vice versa. Differential optical modulator is also shown as including a resistive heating element 490 used to thermally heat differential optical modulator 400 so as to account for process variations that occur during manufacturing of the differential optical modulator. By changing the voltage applied to heating element 490, the notch frequency of the ring is matched to the frequency of the laser.

Figure 9:
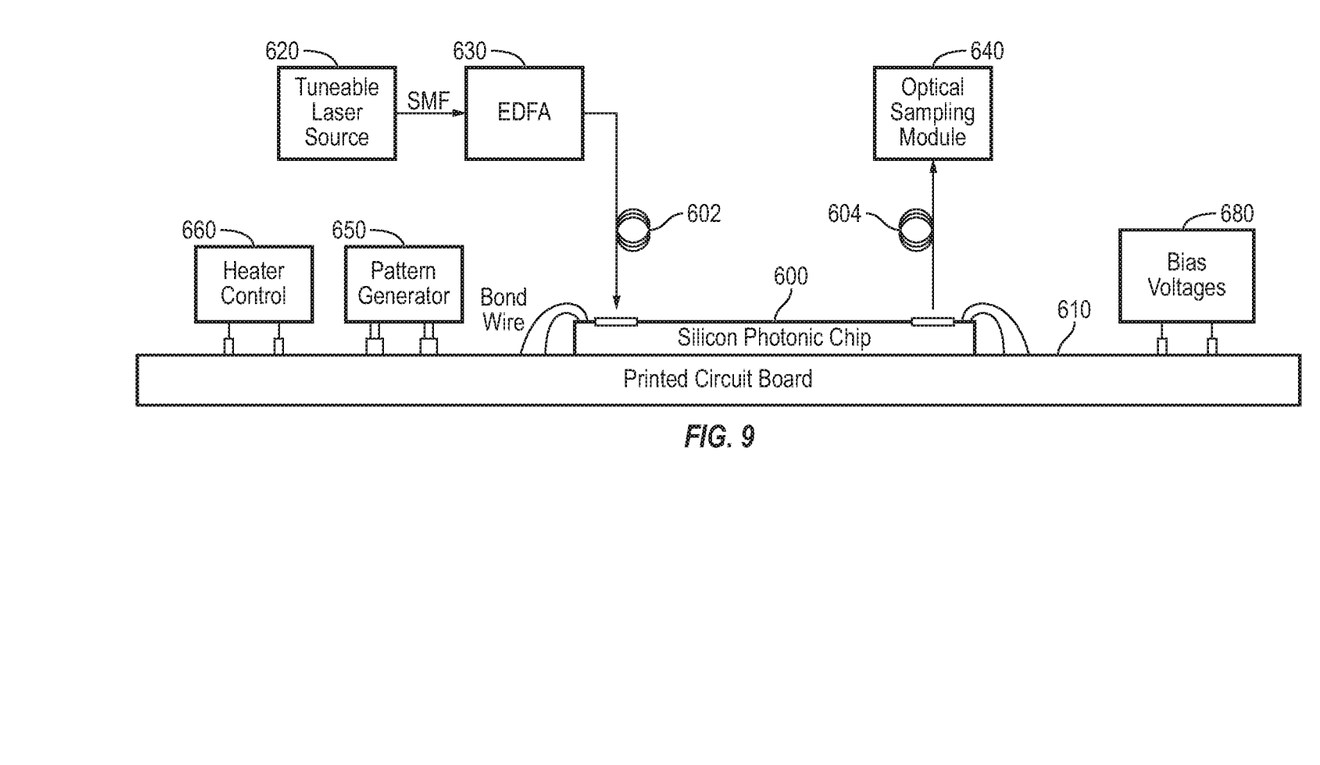
FIG. 9 shows a setup used to measure the performance characteristics of an integrated differential optical ring modulator, in accordance with one embodiment of the present invention.

FIG. 9 shows a measurement setup used to measure the performance characteristics of a differential optical modulator 600 formed as an integrated photonic circuit and having an area less than 0.35 mm². Grating couplers 602 and 604 respectively deliver optical signals to and receive optical signals from differential optical modulator 600. A resistive heater formed near the center of optical modulator ring 600 (see, e.g., FIG. 7) provides a uniform temperature throughout the modulator ring. A second resistive heater formed near the differential modulator's Y-junction is used to match the phases of the input signals at the input ports of differential modulator (see, e.g. FIG. 4A). The currents through the heaters are controlled using heater control unit 660.

Optical modulator ring 600 is shown as being wire-bonded to PCB 610 that carries high-speed and DC signals. A tunable laser source 620, an Erbium doped fiber amplifier (EDFA) 630, and gating coupler 602 are used to deliver an input optical signal to differential modulator 600. The output signal of the differential modulator ring is delivered to optical scope 640 via grating coupler 604. The high-speed differential data signals were driven by a PRBS 31 sequence using a pattern generator 650. The voltage swing for each single-ended signal was 1.75V peak-to-peak. Bias voltage generator 680 is used to control the voltages applied to the phase shifters disposed in the optical modulator, as described above.

Figure 10A:
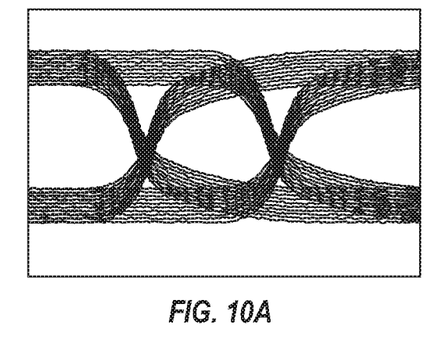
FIGS. 10A and 10B respectively show the measured eye diagrams of the differential optical ring modulator of FIG. 9 at the rates 5 Gb/s and 10 Gb/s respectively.
Figure 10B:
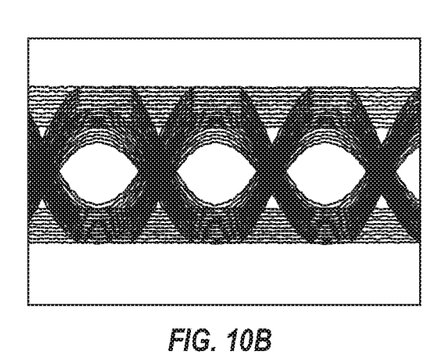

FIGS. 10A and 10B respectively show the measured eye diagrams of the differential optical modulator 600 at the rates 5 Gb/s and 10 Gb/s respectively. The extinction ratio of the output optical data is measured to be 6.2 dB. A portion of the noise seen at the output is associated with the EDFA noise and limited sensitivity of the optical sampling scope.

Figure 11:
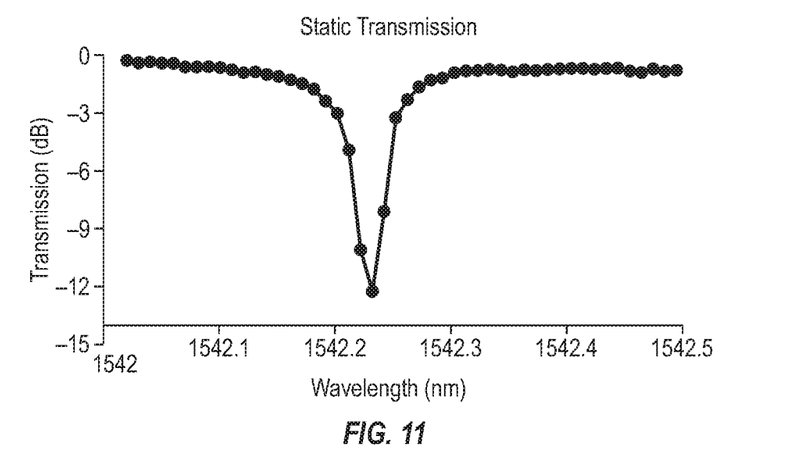
FIG. 11 shows the measured static transmission characteristics of the differential optical ring modulator of FIG. 9.

FIG. 11 shows the measured static transmission of the differential optical modulator 600 near one operational wavelength bias points. From this measurement, the Q of the ring is determined to be approximately 32,000. The tunability of the optical modulator ring was measured by varying the input voltage of the heater and determined to be 12.3 pm/mW.

The above embodiments of the present invention are illustrative and not limitative. Embodiments of the present invention are not limited by any specific frequency or wavelength of the optical signal. Embodiments of the present invention are not limited by the type of optical signal splitter, coupler, phase shifter, and the like that may be used in a differential optical modulator. Other additions, subtractions or modifications are obvious in view of the present disclosure and are intended to fall within the scope of the appended claims.

What is claimed is:

1. A differential optical modulator comprising:
    a splitter adapted to split an incoming optical signal into first and second input signals;
    a first variable coupler adapted to generate a first differential output of the optical modulator in response to the first input signal;
    a second variable coupler adapted to generate a second differential output of the optical modulator in response to the second input signal, wherein said first variable coupler is further adapted to generate a first internal signal applied to the second variable coupler, and wherein said second variable coupler is further adapted to generate a second internal signal applied to the first variable coupler.

2. The differential optical modulator of claim 1 wherein said first variable coupler comprises:
   a first coupler adapted to generate third and fourth internal signals in response to the first input signal and the second internal signal;
   a second coupler adapted to generate the first differential output signal and the first internal signal in response to the first coupler; and
   a first phase shifter disposed between the first and second couplers.

3. The differential optical modulator of claim 2 wherein said second variable coupler comprises:
   a third coupler adapted to generate fifth and sixth internal signals in response to the second input signal and the first internal signal;
   a fourth coupler adapted to generate the second differential output signal and the second internal signal in response to the third coupler; and
   a second phase shifter disposed between the third and fourth couplers.

4. The differential optical modulator of claim 3 further comprising:
   a thermal phase shifter adapted to match phases of the first and second input signals.

5. The differential optical modulator of claim 4 wherein each of the first and second phase shifters comprises a p-n junction adapted to vary the phase shifter's optical length in response to a voltage applied thereto.

6. The differential optical modulator of claim 5 wherein the second phase shifter receives a complement of a first voltage applied to the first phase shifter.

7. The differential optical modulator of claim 6 wherein said first variable coupler comprises a third phase shifter disposed between the first and second couplers, and wherein said second variable coupler comprises a fourth phase shifter disposed between the third and fourth couplers.

8. The differential optical modulator of claim 7 wherein each of the third and fourth phase shifters comprises a p-n junction adapted to vary the phase shifter's optical length in response to a voltage applied thereto.

9. The differential optical modulator of claim 8 wherein said third phase shifter receives the first voltage and the fourth phase shifters receives the complement of the first voltage.

10. The differential optical modulator of claim 9 wherein each of the first, second, third and fourth couplers is a 3-dB coupler.

11. The differential optical modulator of claim 1 wherein each of said first and second variable couplers has an associated optical ring, wherein at any given time either the first variable coupler or the second variable coupler couples power to the coupler's associated ring.

12. The differential optical modulator of claim 1 wherein the third and fourth internal signal have magnitudes and phases defined by a product of $$\begin{pmatrix} \sqrt{1-\alpha} & j\sqrt{\alpha} \\ j\sqrt{\alpha} & \sqrt{1-\alpha} \end{pmatrix}$$

and a matrix defining magnitudes and phases of the first input signal and the second internal signal, wherein $\alpha$ represents a coupling factor and j represents $\sqrt{-1}$.

* * * * *